United States Patent
Kunze et al.

(10) Patent No.: US 6,296,939 B1
(45) Date of Patent: Oct. 2, 2001

(54) HEAT-SENSITIVE MATERIAL COATED WITH POWDER PAINT

(75) Inventors: Peter Eduard Kunze, Drensteinfurt; Leonidas Kiriazis, Münster, both of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/011,547

(22) PCT Filed: Jun. 26, 1997

(86) PCT No.: PCT/EP97/02674

§ 371 Date: Apr. 1, 1998

§ 102(e) Date: Apr. 1, 1998

(87) PCT Pub. No.: WO97/47398

PCT Pub. Date: Dec. 18, 1997

(30) Foreign Application Priority Data

Jun. 7, 1996 (DE) .............................................. 196 22 921

(51) Int. Cl.[7] .................................................... B32B 27/38
(52) U.S. Cl. .......................... 428/413; 428/481; 427/195; 427/317; 427/325; 427/386; 427/397; 427/421; 427/475; 427/553; 427/557
(58) Field of Search .................................... 428/413, 481; 427/475, 553, 195, 325, 317, 386, 397, 421, 557

(56) References Cited

U.S. PATENT DOCUMENTS

| | | | |
|---|---|---|---|
| 4,927,876 | * 5/1990 | Coogan et al. ...................... | 524/457 |
| 5,498,761 | * 3/1996 | Wessling et al. .................... | 427/542 |
| 5,565,240 | * 10/1996 | Smith ................................... | 427/195 |
| 5,594,065 | * 1/1997 | Tien et al. ............................ | 524/507 |
| 5,714,264 | * 2/1998 | Sacharski et al. ................... | 428/413 |
| 5,925,698 | * 7/1999 | Steckel ................................. | 524/322 |

FOREIGN PATENT DOCUMENTS

| | | | |
|---|---|---|---|
| 1 317 826 | 7/1988 | (CA) .............................. | B05D/3/02 |
| 34 24 131 A1 | 6/1984 | (DE) .............................. | B05D/1/14 |
| 195 33 858 A1 | 9/1995 | (DE) .............................. | B05D/3/06 |
| 0 390 636 A1 | 3/1990 | (EP) .............................. | C08J/7/04 |
| WO 90/02613 | 3/1990 | (EP) .............................. | B05D/3/06 |
| WO92/0034 | 9/1992 | (EP) .............................. | C08J/3/12 |
| 2 056 885 A | 8/1980 | (GB) .............................. | B05D/1/12 |

OTHER PUBLICATIONS

Anon. "Powder coating of wood and woodbased materials," DTI Surface Coating Technology, Aug., 1993@ p. 1, LL. 23–24.

G Sauerbrey, holeschichtung im Aufbruch[Wood Coating Flourishing], Report of Powder Meeting, 1991, in CC Hamburg Vinzenz Verlag, Hannove (Abb TB Pulver 91.

Leonardo Zelaschi, "New from the World of Finishes and Finishing," No. 241, May 1998, pp. 165–166.

Alfred Krüger, "Pulver–Beschichtung von Holz und Holzwekstoffen," Verfkroniek, pp. 30–32 (Nov. 1995).

Istvan Radoczy, Tigerwerk A–Wels, "Das Wood–Dual Verfahren zur MDF–Veredelung," I–Lack, 3/95, pp. 96–98.

Alfred Krüger, "Possibilities for Powder–Coartin Wood and Wood Products," DFO Conference, DFO Tagungsbericht Proceedings, 1994.

Simon Peter Hödlmoser, "Powder Coating of MDF Panels in Practice," JOT Seminarunterlagen[JOT Seminar Paper], Münich, Jan. 1995.

Alfred Krüger, "Beschichtung von Holzteilen mit Pulverlack", 1995, pp. 92–97 pp. 30–32 (Nov. 1995).

English translation of Danilo Malavohi, "Powder Coating for Painting Wood and Plastics?", Sep. 1991, pp. 277–278.

"Neue Entwicklugen in der Pulverlacktechnik," Report No. 28 of the meeting in Bonn held Oct. 11 and 12, 1995 of the Deutsche Forschungsgesellschaft für Oberflächetechnik.

Helmut Bauch, Vorbenhandlung von MDF–Teilen vor der Pulverbeschichtung.

G Sauerbrey, holeschichtung im Aufbruch [Wood Coating Flourishing], Report of Powder Meeting, 1991, in CC Hamburg Vinzenz Verlag, Hannove (Abb TB Pulver 91.

Leonardo Zelaschi, "New from the World of Finishes and Finishing," No. 241, May 1998, pp. 165–166.

Alfred Krüger, "Pulver–Beschichtung von Holz und Holzwerkstoffen," Verfkroniek, pp. 30–32 (Nov. 1995).

* cited by examiner

Primary Examiner—Blaine Copenheaver
Assistant Examiner—Christopher Paulraj

(57) ABSTRACT

A layered material consisting of a substrate of heat-sensitive material, preferably wood, and a powder paint coat applied thereon, characterized in that it is obtained by a) optional application of an extender coat,
b) optional application of at least one (water-based) paint,
c) heating of the substrate by microwave irradiation,
d) optional hardening of the liquid paint, preferably by ultraviolet irradiation,
e) application of the powder paint, preferably by electrostatic spraying or by the Tribo process,
f) heating of the powder paint to sintering temperature,
g) subsequent hardening of the paint coat.

29 Claims, No Drawings

HEAT-SENSITIVE MATERIAL COATED WITH POWDER PAINT

FIELD OF THE INVENTION

The present invention relates to coating heat-sensitive materials, preferably wood, with a powder paint.

BACKGROUND OF THE INVENTION

Today's orientation towards technologies that protect the environment is distinguished by ever more stringent regulations governing the maintenance of air purity. For this reason, attempts are made to use these technologies when coating wood and wood based products. Up to the present time, powder-paint technology has not played any significant role when substrates of this kind are being coated at an industrial scale. Reviews of this subject matter can be found in the following publications: Alfred Krüger, Magdeburg, Josef Heinskill, Brunswick "Möglichkeiten der Pulverbeschich-tung von Holz und Holzwerkstoffen," [Possibilities for Powder-coating, Wood and Wood Products], *DFO Tagungsbericht* [DFO Conference Proceedings], 1994; Istvan Radoczy, Tigerwerk A-Wels "Das Wood-Dual Verfahren zur MDF-Veredelung," [The Wood-Dual Process for MDF Processing], *I-Lack, March* 1995, pp. 96–98; Danilo Malavolti "Polveri nella verniciatura del legno e deli plastici?" [Powders for Finishing Wood and Plastics?,"*La Revista del Colore/Verniciatura Industriale* [Industrial Colours and Finishes Review], No. 281, September 1991, pp. 277–278, Simon Peter Höldmoser, Hali Büromöbel, A-Eferding "Pulverbeschichtung von MDF Platten in der Praxis," [Powder Coating of MDF Panels in Practice], JOT Seminarunterlagen [JOT Seminar Papers], Munich, January 1995; G. Sauerbrey, "Holzbeschichtung im Aufbruch," [Wood Coating Flourishing], Report of Powder Meeting, 1991, in CC Hamburg, Vinzenz Verlag, Hannover (Abb. TB Pulver 91); Anon. "Powder coating of wood and woodbased materials," *DTI Surface Coating Technology*, August, 1993; Leonardo Zelaschi "Novita dal mondo dei vernicianti e della verniciatura," [New from the world of finishes and finishing], *La Revista del Colore/Verniciatura Industriale* [Industrial Colours and Finishes Review], No. 241, May, 1998, pp. 165–166.

The difficulties that have been encountered up to the present can be attributed to a number of technical causes. Wood is a natural, non-homogeneous and hygroscopic material. Its properties and features are formed by a number of factors that influence it during its growth and when it is being processed. As an organic material, it is constantly being affected by the environment as it is being processed and used.

The substances that make up wood, including moisture that is contained in it, play a decisive role. As the moisture content of wood changes, not only does it volume change—with anistropy exacerbating existing anatomical problems—its electrical conductivity and its behaviour when wet also change.

Different rates of swelling and shrinkage in materials and coatings, which change as tile moisture content changes, impose enormous mechanical stresses on the bonding systems and lead to premature failures at critical points. The constituent substances of the wood migrate to the surface and can result in pronounced colour changes and uncontrolled chemical reactions with the substances used in the coatings.

Problems encountered when powder-coating wood and wood based products are caused by the migration of volatile substances such as water, resins, waxes and terpenes from the substrate; this migration is brought about by the high temperatures that are required in order to form a film from the powder paint. These volatile components result in bubbles being included in the film These, in their turn, degrade the chemical stability of the film, its mechanical properties, and the appearance of the surface of the paint. The lowest possible melt and polymerization temperature is required at the lowest possible viscosity of the molten powder paint in order to reduce off-gassing of the substrate, and in order to encourage de-aeration of the melt. But limits are imposed on these requirements with respect to the shelf life and amenability to processing of powder paints. The exacting demands of the furniture industry for flawless and homogeneous surfaces constitute another challenge to the performance of powder paints of this kind.

For all of the above reasons, it is impossible to simply transfer the technological conditions for powder paint that proved themselves when used such paints are applied to metallic surfaces.

For this reason, I. Radoczy, *I-Lack* 3/95, 63rd year, pp. 96 et seq. proposes using a symbiosis of powder paint and water-based paint. The author proposes a formulation for a water paint that has been adapted for wood, and which is used to wet the substrate. Using this water paint causes the powder paint to adhere to the wood substrate. However, a disadvantage with this procedure is that the advantages of the totally emission-free dry powder paint are not exploited. For this reason, there is still a need to use powder paints without the addition of water-based paints.

For this reason, it is the task of the present invention to make available a layered material consisting of a substrate that is of heat-sensitive material, preferably wood, and a powder paint coat that is applied thereto, which simultaneously ensures the minimal formation of bubbles and optimization of its flow and polymerization characteristics.

SUMMARY OF THE INVENTION

Most surprisingly, according to the present invention, it has been possible to solve this problem by a layered material that can be obtained by:

a) heating the substrate by microwave radiation;

b) application of a powder paint to the surface of the substrate, preferably by electrostatic spraying;

c) heating the powder paint to sintering temperature;

d) subsequent hardening of the paint coat

DETAILED DESCRIPTION OF THE INVENTION

All heat-sensitive materials can be used as substrates for the coating; examples of these are solid woods, as well as hard-fibre and medium-density panels (MDF). In particular, according to the present invention, it is possible to use materials that are used in the furniture industry. In particular, the layered material according to the present invention is intended to replace the furniture surfaces used in the past by an emission-free system.

It is preferred that the powder paints used according to the present invention contain epoxy resins, carboxypolyesters, catalysts, secondary substances and, if necessary, secondary agents, and additives typically associated with powders, and agents to enhance their frangibility.

In general, the epoxy resins based on bisphenol A and bisphenol F have a functionality of 2 and the epoxydized novolack resins have a functionality of greater than 2.

Especially preferred in the powder paints according to the present invention are novolac resins with a mean functionality in the range from 2.4 to 2.8, and with an equivalent epoxy weight in the range from 600 to 850. In the case of the epoxydized novolac resins, some of the phenolic hydroxyl groups can be etherified with alkyl or similar groups. Epoxydized groups are introduced into the molecule by conversion of the phenolic hydroxyl groups with epichlorhydrides. When this is done, the so-called epoxydized novolac is formed starting with the novolacs. The epoxydized novolacs are structurally related to bisphenol-A resins. Epoxydizing novolac resins can be manufactured by epoxydized novolacs that consist, for example, of three to four phenol nuclei that are connected to each other by methylene bridges. Alkyl-substituted phenols that have been converted with formaldehyde can be used as novolac resins.

The products that are a commercially available under such names as Araldit, Grilesta, or Epikote are suitable epoxy resins.

The epoxy resins that are used in the powder paints (Component A) according to the present invention are solid epoxy resins with an equivalent epoxy weight from 300 to 5500, preferably 800 to 3000. Aromatic, aliphatic and/or cycloaliphatic epoxy resins are suitable. It is preferred that aromatic epoxy resins based on bisphenol-A and/or bisphenol-F and/or novolac-type epoxy resins be used. Epoxy resins based on bisphenol-A or bisphenol-F that are especially preferred for use have an equivalent epoxy weight from 500 to 2000. Novolac-type epoxy resins that are especially preferred for use have an equivalent epoxy weight from 500 to 1000.

It is, of course, self-evident that other epoxy resins such as alkyleneglycolideglycidyl ether, or the branched successor products thereof, epoxy resins based on bisphenol-A or F that have been flexibilized with alkylene glycols, and others, can be used. In addition, mixtures of various epoxy resins referred to above are also suitable.

Polyacrylate resins that can be produced by copolymerization of at least one ethylene unsaturated monomer that contains at least one epoxy group in the molecule, with at least one additional ethylene unsaturated monomer that contains no epoxy group in the molecule, at least one of the monomers being an ester of acrylic acid or methacrylic acid, are suitable as epoxy-functional binding agents for the clear powder paints.

Polyacrylate resins that contain epoxy groups are known, for example, from EP-A-299 420, DE-B-22 14 650, DE-B-27-49-576, U.S. Pat. Nos. 4,091,048, and 3,781,379.

Glycidlylacrylate, glycidylmethacrylate, and allyglycidylether are examples of the ethlylene unsaturated monomers that contain at least one epoxy group in the molecule.

Examples of ethylene unsaturated monomers that contain no epoxy group in the molecule, are alkyl esters of acrylic and methacrylic acid that contain 1 to 20 carbon atoms in the alkyl radical, in particular methacrylate, methylmethacrylate, ethylacrylate, ethlylmethacrylate, butylacrylate, butylmethacrylate, 2-ethylhexylacrylate, and 2-ethelhexylmethacrylate. Other examples of ethylene unsaturated monomers that contains no epoxy groups in the molecule are acids such as acrylic acid and methacrylic acid. Acid amide, such as acrylic acid and methacrylic acid amide, vinyl aromatic compounds such as styrene, methylstyrene, and vinyltoluol, nitrites such as acrylic nitrile and methacrylic nitrile, vinyl and vinylidene halides such as vinyl chloride and vinylidene fluoride, vinyl esters such as vinyl acetate and monomers such as hydroxyethyl acrylate and hydroxyethyl methacrylate that contain hydroxyl groups.

Usually, the polyacrylic resin that contains epoxy groups has an equivalent epoxy weight from 400 to 2500, preferably 500 to 1500 and in particular 600 to 1200, an mean molecular weight (determined by gel permeation chromatography using a polystyrene standard) from 1000 to 15000, preferably 1200 to 7000, and in particular from 1500 to 5000 and a glass transition temperature ($T_G$) from 35 to 75, preferably from 40 to 70, and in particular from 40 to 60° C. (as measured by differential scanning calorimetry (DSC)).

The polyacrylate resin that contains epoxy groups can be manufactured by radical polymerization, using generally well known methods.

Acid functional agents can serve as hardeners for the epoxy functional acrylates described above.

Polyacrylate resins are suitable as acid functional bonding agent; these can be produced by colpolymerization of at least one ethylene unsaturated monomer that contains at least one acid group in the molecule, with at least one additional ethylene unsaturated monomer that contains no acid group in the molecule.

The polyester that is, if necessary, used in the powder paints according to the present invention has an acid number from 25 to 120 mg KOH/g, preferably 30 to 90 mg KOH/g, and, in particular, 60 to 90 mg KOH/g and an OH number of at least 10 mg KOH/g, preferably of at least 15 mg KOH/g and preferably $\leq$30 mg KOH/g. It is preferred that polyester with a functionality of $\geq$2 be used. The numerical mean molecular weights of the polyesters generally lie between 1000 and 100000, preferably between 1500 and 5000. It is preferred that polyester approved by the FDA be used.

According to the present invention, phenolic hardeners are also suitable for hardening the epoxy functional bonding agent.

All solid compounds with more than one phenolic OH group, preferably 1.8 to 4 and in particular $\geq$3 phenolic OH groups per molecule and an equivalent hydroxyl weight, relative to the OH groups, of 100 to 500, preferably 200 to 300, are suitable as hardeners. A prerequisite is that the combination of epoxy functional bonding agent and the phenolic resins reacts at a stoving temperature of lower than 140° C. and exhibits extremely low yellowing.

In the powder paints according to the present invention, the epoxy resin component is usually used in a quantity of 29 to 80%-wt, preferably from 35 to 60%-wt, relative in each case to the total weight of the powder paint.

In the powder paints according to the present invention, the hardener is usually used in a quantity of 20 to 71%-wt, preferably from 40 to 65%-wt, relative in each case to the total weight of the powder paint.

The powder paints according to the present invention contain 50 to 90%-wt, preferably 60 to 80%-wt bonding agent and 10 to 15%-wt, preferably 20 to 40%-wt extenders.

The powder paints according to the present invention contain one or more suitable catalysts for hardening the epoxy resin. Suitable catalysts are the phosphonium salts of organic or inorganic acids, imidazole, and imidazole derivatives, quaternary ammonia compounds, and amines. The catalysts are generally used in proportions of 0.001%-wt to approximately 10%-wt, relative to the total weight of the epoxy resin and of the phenolic polymerizing agent.

Imidazole, 2-methylimidazole, ethyltriphenyl phosphonium chloride or one other salt of the same, a chinolin derivative, such as described in EP-B- 10805, a primary, secondary, or tertiary aminophenol, aluminum acetylacetonate, or a toluol sulfonic acid salt, or a mixture of the above-named catalysts are also suitable as catalysts.

Glycidyl-group functionalized crystalline silicic acid modification can be used as extenders. Usually, they are used in the cited range from 10 to 50%-wt relative to the total weight of tile powder paints. In some cases, however, proportions of more than 50%-wt of extender are possible.

The crystalline silicic acid modifications include quarz, crystobalite, tridymite, keatite, stishovite, melanophlogite, coesite, and fibrous silicic acid. The crystalline silicic acid modifications are glycidyl-group functionalized, this glycidyl group functionalization being brought about by surface treatment. As an example, this involves silicic acid modifications based on quartz, crystobalite and vitreous fused silica and produced by treating crystalline silicic acid modifications with epoxy silanes. The glycidyl group functionalized silicic acid modifications can be obtained, for example, under the names Silbond® 600 EST and Silbond® 6000 EST (manufactured by Quarzwerke GmbH), and are produced by converting crystalline silicic acid modifications with epoxy silanes.

It is preferred that the powder paints according to the present invention contain 10 to 40%-wt of glycidyl-group functionalized crystalline silicic acid modifications relative to the total weight of the powder paints.

The powder paints can also contain additional inorganic extenders and pigments, for example, titanium oxide, barium sulphate, and extenders that are based on silicates, for example, talcum, kaolin, magnesium silicate, aluminum silicate, mica, and the like. In addition, the powder paints can also contain secondary agents and additives. Examples of these are flow agents, degassing agents such as benzoin, and agents that enhance frangibility.

The polyesters that contain carboxyl groups and hydroxyl groups can be produced by the usual methods (see Houben Weyl, *Methoden der organischen Chemie* [Methods of Organic Chemistry], 4th Ed., Vol. 14/2, Georg Thieme Verlag, Stuttgart, 1961).

Aliphatic, cycloaliphatic, and aromatic di- and polycarboxylic acids such as phthalic acid, tere-phthalic acid, isophthalic acid, trimellithic acid, pyromellithic acid, adipinic acid, succinic acid, glutaric acid, pimelinic acid, suberinic acid, acelainic acid, sebacic acid, and others are suitable for use as carboxylic acid components used to manufacture the polysesters. The acids can also be used in the form of their esterifiable derivatives (e.g., anhydrides) or of their re-esterifiable derivatives (e.g., dimethylesters).

The di- and/or polyoles that are usually used are suitable for manufacturing the polyesters; these are, for example, ethylene glycol, propandiol-1,2 and -1,3, butane dioles, diethylene glycol, triethylene glycol, tetraethylene glycol, hexandiole-1,6, neopentyl glycol, 1,4-dimethylol cyclohexane, glycerine, trimethylol ethane, trimethylol propane, pentaerythrite, ditrimethylol propane, diglycerine, and the like. The polyesters so obtained can be used singly or in mixtures of the various polyesters.

In addition to the powder paints described above, it is also possible to use powders that can be hardened by irradiation. In particular, these are powders that can be hardened with ultraviolet light or electron irradiation. Powders such as these are described, for example, in EP application 0585742.

The powder paints according to the present invention that can be hardened by ultraviolet light usually consist of a solid, unsaturated polyester (maleate) and a solid, copolymerizable hardener such as, for example, solid polyurethanes that contain (meth)-acrolyl groups (see EP 0 585 742) or solid polymers that contain vinyl ether groups (see WO 93/25596).

The compounds that are described in EP 0 585 742 can be used as polyesters. Copolymerizable hardeners are similarly known from this patent application.

However, solid polyester acrylates or other copolymers that contain vinyl or acryl groups, as are described, for example, in U.S. Pat. No. 3,574,303, can also be used as copolymerizable components. Examples of copolymers that contain vinyl groups and acryl groups are described in WO 93/25596.

Powder paints are manufactured using known methods (see, for example, the product information brochure titled *Pulverlacke* [Powder Paints] published by BASF Lacke+Farbe AG, by homogenization and dispersion, for example, by using an extruder, a screw-type kneading machine, or the like. Once they have been manufactured, the powder paints are adjusted to the desired grain-size distribution by screening and sieving.

The grain size distribution is so adjusted that at least 90%-mass of the powder paint particles are of a particle size between 1 and 120 $\mu$m, preferably between 1 and 100 $\mu$m. It is preferred that powder paint be used in which at least 90%-mass of the powder paint particles are of a particle size that is between 1 and 60 $\mu$m, and preferably between 4 and 25 $\mu$m.

Prior to being coated with the powder paints described above, the substrate that is to be coated is heated. According to the present invention, this is done by means of microwave irradiation. Using this treatment, according to the present invention it is, most surprisingly, possible to achieve an optimal coating using powder paints.

When applying coatings on the materials discussed herein, particular attention must be paid to the effect of the moisture content in the wood. The presence of moisture is not confined to the surface of the wood, as it is in the case of metals. As a hygroscopic substance, wood contains moisture throughout all its useful life, and the amount of water it contains will be greater or less as a function of environmental conditions. The moisture contained in wood is in equilibrium with the relative air humidity in the environment. Depending on the location in which they are used (interior, exterior), wood and wood based products are adjusted to the average value that is appropriate for the place of use during a drying process. When used inside, as the rule the moisture contained in wood will be approximately 4–8% (although in many types of wood this will vary) and when used outside, the moisture content will be between 10 and 24%. If tile moisture content is higher than 8%, increasing quality problems will have to be anticipated when coating wood products with heat hardened paint materials.

If wood and wood based products are coated with powder paint electrostatically, the moisture content of the wood will essentially determine the electrical conductivity of the material. As a rule, high humidity values will have a negative effect on the quality and tile durability of the coatings. During application of the heat that is required to melt and harden the powder paint coat, moisture and other volatile components of the wood will be given off as gas, depending on the temperature of the work piece and the duration of the heating. As the removal of moisture or the escape of gas becomes more pronounced, the danger of bubbles forming in the coating film will increase. Pores and bubbles in the coating lead to the more or less pronounced degradation of quality. However, as moisture is given off during the heating process, wood work pieces may undergo coloration, deformation, and crack due to shrinkage. Subsequent absorption of moisture will cause swelling and thus the build-up of internal stresses in the boundary layer between the carrier material and the coating, and this may cause damage to the workpiece.

Processing according to the present invention, using microwave irradiation, means that the surface of the wood does not dry out. At the same time, most surprisingly, the wood is degassed so that volatile substances, in particular moisture as well as terpene hydrocarbons can escape from the coniferin wood, out of the upper layers of the wood based substance, even before it is coated or during the heating phase (smelt phase of the powder) so that the subsequent reaction phase is not disrupted by this. Most surprisingly, this prevents the formation of bubbles in the paint coat.

According to the present invention, the surface of the wood is heated to 80 to 120° C., preferably to approximately 100° C. by microwave irradiation. Subsequently, the powder paint is applied to the surface of tile substrate. This is enerally done by electrostatic spraying, but preferably by using the Tribo process.

A surface resistance of approximately $10^9$ to $10^{10}$ Ohms is needed to ensure the even build-up of the coat of powder paint on the surface of wood work pieces. Thermally tempered wood work pieces generally have a surface resistance of $10^2$ Ohms when they reach a surface temperature of 80° C., and for this reason they cannot be coated electrostatically. Even if the Tribo process is used, it is difficult for the paint coat to build up. Thinner coats (approximately 50 $\mu$m or less) are possible, however, nevertheless, because of the lack of homogeneity of the work piece, they are very uneven.

In contrast to the foregoing, wood work pieces that have been pre-tempered by microwave irradiation have a surface resistance (at the same surface temperature) of approximately $10^8$ to $10^9$ Ohms. This is brought about by the movement of moisture from the deeper layers of the wood to the surface, because during this type of heating the interior of the work piece is heated more powerfully than the surface. When the microwave irradiation is stopped, the vapour pressure in the interior of the work piece capillaries, which has been caused by tile electromagnetic waves, decreases so that the continued movement of moisture is curtailed. In the subsequent cooling period, as the surface cools down (through tile coating and the coating material) and the re-heating of the surface by infrared irradiation or forced-air, the internal areas of the wood work piece are no longer affected since wood, which is a very poor conductor of thermal energy, transfers scarcely any energy from the surface into the interior.

In a further stage, the powder paint is sintered at temperatures of 100 to 170° C., preferably from 120 to 160° C. Electromagnetic radiation is not suitable for sintering the powder paint on woodbased products. As a rule, the powder paint is heated either by forced-air or by infrared irradiation. The heating gradient achieved when infrared radiation is used is significantly better than is the case with conductive heat transfer. However, because of the great depth to which infrared rays can penetrate, there is a danger that the water contained within the capillaries will boil off, even in the deeper layers or, for example, that the glue used for attaching veneer will "cook." For this reason, only medium and long-wave infrared radiators should be used. It is preferred that a combination of infrared radiation for tile sintering, process and convective heat transfer (nozzle dryers) for the subsequent hardening reaction be used. In the case of powder paints that are hardened by radiation, heat is required only for the sintering process. In the case of other paints that are hardened by ultraviolet radiation, the hardening should be started directly after the sintering process, since the reduction of temperature affects the reactivity of the powder. For this reason, the hardening reaction is, as a rule, carried out at temperatures between 80 and 160° C., and preferably between 90 and 150° C.

In the case of particularly sensitive substrates, wood varieties that have large pores, or wood based composite materials, such as plywood, it is advisable to apply a coating of, for example, water based paint that is as electrically conductive as possible, to the surface of the woodbase material prior to the application of the powder coating. In principle, it is possible to apply this coating, for example, by rolling, pouring, or spraying, prior to the tempering process, and then dry it by means of microwave radiation. However, the high temperature of the material has an adverse affect on subsequent grinding. For this reason, this procedure can be recommended only for water-based paints that are hardened by ultraviolet radiation. As a rule, water-based paints are dried to approximately 6% residual moisture by microwave radiation. Further drying is not economically feasible since the additional energy that is used only serves to heat the wood work piece, while the coat of water-based paint is enriched by moisture from the underlying material. Given a suitable formulation, water-based paints that are hardened by ultraviolet radiation can be hardened even at a moisture content of 6% without any problems. These coatings can be smoothed even at higher surface temperatures, so that it is not necessary to cool the parts before grinding. What is important is that this coating remains permeable to water vapour in the temperature range from 60 to 120° C., in order to prevent the accumulation of water vapour in the wood based material beneath the coating. Non-permeable coatings such as polyurethane base paints are not suitable for this process. Because of their poor permeability, some of the gases and moisture that build up will only escape above 100° C., so that bubbles will form during the powder-hardening reaction. Combinations of acrylate dispersions or emulsions that can be hardened by ultraviolet radiation, and physically drying acrylate dispersions are particularly suitable for these coatings because these paints are ten times more permeable to water vapour than duroplastics.

The compounds described in EP 022 003 and EP 0 089 497 a suitable as water-based paints.

The present invention will be described in greater detail below on the basis of examples:

EXAMPLES

Water-conductive Paint

Water-conducting paint No. 1:

Basis: PUR dispersion
dark gray
| | |
|---|---|
| 40.0% PUR dispersion | (Daotan VTW 40%) |
| 1.2% dispersion agent | (Disperbyk 182) |
| 1.2% butylglycol | |
| 2.6% wetting agent | |
| 0.5% anti-precipitant | (Aerosil 380) |
| 1.9% conducting soot | (Ketjenblack) |
| 11.2% extender | (Blank fixe, talcum) |
| 28.0% titanium oxide | (Titanium Rutil) |
| 13.4% water | |

Dispersion in an agitator grinder

-continued

Density = 1.55; highly viscous, thixotropic
Dilute with approximately 15% water for spraying
Drying: air-dry for 5–8 minutes, then 15–20 minutes
at 80° C.
Surface resistance $R_O$ = <100 kΩ
Water-conducting paint No. 2:

Basis: PUR dispersion
semi-transparent 40.0% PUR dispersion (Daotan VTW 40%)
1.2% dispersion agent (Disperbyk 182)
1.2% butylglycol
2.6% wetting agent
0.5% anti-precipitant (Aerosil 380)
30.0% conducting mica (Minatec)
11.1% extender (silicate, talcum)
13.4% water
Dispersion in an agitator grinder
Density = 1.45; highly viscous, thixotropic
Dilute with approximately 15% water for spraying
Drying: air-dry for 5–8 minutes, then 15–20 minutes
at 80° C.
Surface resistance $R_O$ = <$10^8$Ω
Water-conducting paint No 3: UV hardenable Basis: UV dispersion, acrylate dispersion
gray
20.0% UV dispsersion (Halwerdrol UV)
20.0% acrylate dispersion (Uramul XP)
1.2% dispersion agent (Disperbyk 182)
2.0% wetting agent
0.5% anti-precipitant (Aerosil 380)
1.5% conducting soot (Ketjenblack)
25.0% titanium oxide (Titanium Rutil)
11.0% extender (Blank fixe, talcum)
3.2% photoinitiator (Irgacure 1273)
0.6% flow agent
Dispersion in an agitator grinder
Density = 1.39, highly viscous, thixotropic
Rate of application: 20–30 g/m$^2$ per coat
Application technique: rollers
Rate of application: 20–30 g/m$^2$
Drying time: 2–5 minutes at 80° C., nozzle dryer
UV radiation intensity: 600 mJ/m$^2$ (Lightbag IL 390)
Lamp type: Combination gallium dosed + standard If needs be, both base formulations can be modified with 3–5% of an isocyanate that is suitable for hardening water-based paints.

EXAMPLES

Powder Paints

Powder paint No. 1:

Basis: epoxy-polyester
white
40.0% carboxy PES[1] (Grilesta V 7206)
40.0% epoxy resin Type 34 (Epikote 3003)
0.5% flow agent (Aeronal 4F)
14.5% titanium oxide (Titanium Rutil 2160)
5.0% extender (silicate)
[1]carboxypolyester, rapid hardening; EP/SP-75° C.
Extruding, grinding and screening,
grain size under 50 μm
Hardening: 30 minutes at 140° C.
Powder paint No. 2:

Basis: epoxy-polyester
semi-transparent
40.0% carboxy PES[1] (Grilesta V 7206)
40.0% epoxy resin Type 34 (Epikote 3003)
0.5% flow agent (Aeronal 4F)
19.5% extender (silicate)
[1]carboxypolyester, rapid hardening; EP/SP-75° C.

-continued

Extruding, grinding and screening,
grain size under 50 μm
Hardening: 30 minutes at 140° C.
Powder paint No. 3:

Basis: maleate + acrylolurethane
transparent
67.0% maleate[2] (Alftalat VAN 1743)
29.0% acrylylurethane[3] (Additol VXL 1395)
3.0% photoinitiator (Irgacure 184)
1.0% flow agent (Byk 364 P)
[2] = unsaturated polyester as described in
EP 0 585 742 Al; SP approximately 90° C.
[3] = acrylate as described in EP 585 742 Al;
SP approximately 88° C.
Extruding, grinding and screening,
grain size under 50 μm
Hardening: melting 5 minutes 140° C. + radiation
does 400 mJ/cm$^2$ (Lightbag 390)
Powder paint 4: UV hardened Basis: maleate + acrylolurethane
white
44.0% maleate[2] (Alltalat VAN 1743)
29.0% acrylolurethane[3] (Additol VXL 1395)
20.0% titanium oxide (Titanium Rutil)
4.0% photoinitiator (Darocure 64263)
3.0% flow agent (Additol XL 496)
[2] = unsaturated polyester as described in
EP 0 585 742 Al; SP approximately 90° C.
[3] = acrylate as described in EP 585 742 Al;
SP approximately 88° C.
Extruding, grinding and screening, grain size
under 50 μm
Hardening: melting 5 minutes 140° C. + radiation
does 400 mJ/cm$^2$ (Lightbag 390)

COATING EXAMPLES

Powder Paints

Coating Example No. 1

MDF with epoxy-polyester powder
white
Medium density fibre (MDF) panel with shaped edges
the edges of the MDF panel were insulated and primed separately with 2K-PUR priming extender, dried and ground;
the panels prepared in this way are heated in a microwave channel (2 minutes at 5×2 Kw generator power output) to a surface temperature of 100°;
next, the powder described in Example 1 is applied to all sides with a Tribo sprayer. Rates of application: flat surfaces—approx. 80 g/m$^2$; edges—approx. 50 g/m$^2$
powder sintered in forced-air oven at 160° for 2–3 minutes, followed by
hardening, 30 minutes, 140° C.
Result: even coating, lightly structured in edge areas, somewhat too thin.

Coating Example 2

MDF with epoxy-polyester powder and conducting base
white
MDF panel with shaped edges
the edges of the MDF panel were insulated and primed separately with 2K-PUR priming extender, dried and ground; they were then sprayed with water-based conducting paint No. 1: rate of application approx. 50 g/m² the panels prepared in this way are coated with water conducting paint No. 3 by rollers (rate of application approx. 30 g/m²) and dried in a microwave channel (2 minutes at 5×2 Kw generator power output), and then hardened in the UV channel at a radiation dose rate of 600 mJ/cm².

Next, the powder as described in Example 1 is applied to all sides. Rate of application: flat surfaces—approx. 100 g/m²; edges—approx 80 g/cm² the powder is sintered in a forced-air oven at 160° C. for 2–3 minutes and then hardened for 30 minutes at 140° C.

Result: even coating, slightly structured.

Coating Example No. 3

MDF panel with UV powder and conducting base white

MDF panels with shaped edges the edges of the MDF panel were insulated and primed separately with 2K-PUR priming extender, dried and ground; they were then sprayed with water-based conducting paint No. 1: rate of application approx. 50 g/m² the panels prepared in this way are coated with water conducting paint No. 3 by rollers (rate of application approx. 30 g/m² and dried in a microwave channel (2 minutes at 5×2 kW generator power output), and then hardened in the UV channel at a radiation dose rate of 600 mJ/cm².

Next, the powder as described in Example 4 is applied to all sides. Rate of application: flat surfaces—approx. 70 g/cm²; edges—approx 60 g/cm² the powder is sintered in a forced-air oven at 140° C. for 2–3 minutes and then

UV hardened at 120° C. and at a radiation dose rate of 600 mJ² (gallium dosed radiator)

Result: even coating, scarcely any structuring.

Coating Example 4

Solid beech treated with epoxy-polyester powder semi-transparent

Treated solid red beech with shaped edges the finely ground parts are coated on all sides with the powder described in Example 2, using a Tribo sprayer. Rate of application: flat surfaces and edges—approx 40 g/m² the powder is sintered in a forced-air oven at 160° C. for 2–3 minutes, and then hardened for 30 minutes at 140° C.

Result: impossible to achieve an even coating structure; the coating itself is noticeably frothy.

Coating Example 5

Solid beech treated with epoxy-polyester powder semi-transparent

Treated solid red beech with shaped edges the finely ground parts are heated in a convection oven to a surface temperature of approximately 100° C., and then coated on all sides with the powder described in Example 2, using a Tribo sprayer. Rate of application: flat surfaces and edges—approx. 70 g/m² the powder is sintered in a forced-air oven at 160° C. for 2–3 minutes, and then hardened for 30 minutes at 140° C.

Result: impossible to achieve an even coating structure; the coating itself is noticeably frothy.

The glued joints can be clearly seen.

Coating Example 6

Solid beech treated with UV powder

Treated solid red beech with shaped edges the finely ground parts are heated in a convection oven to a surface temperature of approximately 100° C., and then coated on all sides with the powder described in Example 3, using a Tribo sprayer. Rate of application: flat surfaces and edges—approx. 70 g/m² the powder is sintered in a forced-air oven at 140° C. for 2–3 minutes, and then UV hardened at 140° C. at a radiation dose rate of 400 mJ/cm².

Result: impossible to achieve an even coating structure; the coating itself is noticeably frothy.

The glued joints can be clearly seen.

Coating Example 7

Solid beech treated with epoxy-polyester powder semitransparent

Treated solid red beech with shaped edges the finely ground parts are heated in a microwave channel (2 minutes at 5×2 kW generator power output) to a surface temperature of approximately 100° C., and then coated on all sides with the powder described in Example 2, using a Tribo sprayer. Rate of application: flat surfaces and edges—approx. 70 g/m² the powder is sintered in a forced-air oven at 160° C. for 2–3 minutes, and then hardened for 30 minutes at 140° C.

Result: an even coating stricture; there is extremely fine foam in the coating.

Coating Example 8

Solid beech treated with UV powder transparent

Treated solid red beech with shaped edges the finely ground parts are heated in a microwave channel (2 minutes at 5×2 kW generator power output) to a surface temperature of approximately 100° C., and then coated on all sides with the powder described in Example 3, using a Tribo sprayer. Rate of application: flat surfaces and edges—approx. 70 g/m² the powder is sintered in a forced-air oven at 160° C. for 2–3 minutes, and then UV hardened at 120° C. at a radiation dose rate of 400 mJ/m²

Result: an even coating structure; scarcely any extremely fine foam in the coating.

Coating Example 9

Solid red beech treated with epoxy-polyester powder and conducting base semi-transparent Treated solid red beech with shaped edges the edges and the surfaces of the panel are coated separately with water-based paint No. 2 (rate of application approx. 50 g/m² wet, by spraying), dried in a microwave channel (2 minutes at 5×2 kW generator power output), and stored overnight the parts are then smoothed and coated on all sides with the powder as described in Example 2, using a Tribo sprayer. Rate of application: flat surfaces and edges—approx. 70 g/m² the powder is sintered in a forced-air oven at 160° C. for 2–3 minutes and then hardened for 30 minutes at 140° C.

Result: an even, semi-transparent coating, lightly structured.

Coating Example 10

Solid beech treated with UV powder and conducting base transparent

Treated solid red beech with shaped edges the edges and the surfaces of the panel were coated separately with water-based paint No. 2 (rate of application approx. 50 g/m² wet, by spraying), dried in a microwave channel (2 minutes at 5×2 kW generator power output), and stored overnight the parts were then smoothed and coated on all sides with the powder as described in Example 3, using a Tribo sprayer. Rate of application: flat surfaces and edges—approx. 60 g/m² the powder is sintered in a forced-air oven at 160° C. for 2–3 minutes, and then UV hardened at 120° C. at a radiation intensity of 400 mJ/m²

Result: even, slightly cloudy coating, scarcely structured.

What is claimed is:

1. A layered material comprising a substrate of wood and a powder paint coat applied thereon, the layered material resulting from the process of
   a) applying to the substrate of wood a coating selected from the group consisting of extender coats and water-based paints,
   b) heating the substrate of wood by microwave irradiation,
   c) hardening the coating,
   d) applying a powder paint to the substrate,
   e) heating the powder paint to sintering temperature, and
   f) hardening the paint.

2. The layered material of claim 1, wherein the wood substrate is heated by microwave radiation to 80 to 120° C., the powder paint is heated to 100 to 170° C., and the paint is hardened by heating to 80 to 160° C.

3. The layered material of claim 2, wherein the powder paint is heated to 120 to 160° C. and the paint is hardened by heating to 90 to 150° C.

4. The layered material of claim 1, wherein the powder paint is heated to sintering temperature by convection or by infrared irradiation, and the paint is hardened by irradiation selected from the group consisting of ultraviolet irradiation, electron irradiation and mixtures thereof.

5. The layered material of claim 1 wherein the powder paint applied comprises epoxy resins and polyesters that contain carboxyl groups.

6. The layered material of claim 1, wherein the powder paint applied comprises
   a) at least one epoxy resin with an equivalent epoxy weight of 300 to 5500,
   b) at least one polyester with an acid number from 25 to 120 mg KOH/g and an OH number of greater than 10 mg KOH/g,
   c) at least one epoxy resin with an equivalent epoxy weight from 150 to 3000, and
   d) optionally an additive selected from the group consisting of catalysts, secondary agents, powder paint additives, degassing agents, flow agents, radical interceptors, antioxidants and mixtures thereof.

7. The layered material of claim 6, wherein the powder paint applied comprises at least one of components a) or c) selected from the group consisting of epoxy resins comprising bisphenol A, epoxy resins comprising bisphenol F, novolac epoxy resins and mixtures thereof.

8. The layered material of claim 7, wherein the powder paint applied comprises at least one of components a) or c) selected from the group consisting of epoxy resins comprising bisphenol A, epoxy resins comprising bisphenol F, said epoxy resins having an equivalent epoxy weight of 500 to 2000, novolac epoxy resins having an equivalent epoxy weight of 500 to 1000 and mixtures thereof.

9. The layered material of claim 6 wherein the powder paint applied has a grain-size distribution with a mean particle size between 1 and 120 μm.

10. The layered material of claim 6, wherein the powder paint applied comprises
    a) at least one epoxy resin with an equivalent epoxy weight of 800 to 3000,
    b) at least one polyester with an acid number from 25 to 120 mg KOH/g,
    c) at least one epoxy resin with an equivalent epoxy weight from 150 to 400, and
    d) optionally an additive selected from the group consisting of catalysts, secondary agents, powder paint additives, degassing agents, flow agents, radical interceptors, antioxidants and mixtures thereof.

11. The layered material of claim 1, wherein the coating applied in step a) is a water-based paint.

12. The layered material of claim 11, wherein the water-based paint comprises a physically drying polyurethane dispersion.

13. The layered material of claim 11, wherein the water-based paint comprises a physically drying acrylate dispersion in combination with a polyurethane dispersion, that is hardened by ultraviolet irradiation.

14. The layered material of claim 11, wherein the liquid paint is hardened by ultraviolet radiation.

15. The layered material of claim 9, wherein the powder paint applied has a grain-size distribution with a mean particle size between 1 and 60 μm.

16. The layered material of claim 15, wherein the powder paint applied has a grain-size distribution with a mean particle size between 4 and 25 μm.

17. The layered material of claim 11, wherein the water-based paint comprises a physically drying polyurethane dispersion and electrically conducting pigments.

18. A process for manufacturing a layered material comprising a substrate of wood and a powder paint coat applied thereon, the process comprising
    a) applying to the substrate of wood a coating selected from the group consisting of extender coats and water-based paints,
    b) heating the substrate by microwave irradiation,
    c) hardening the coating,
    d) applying a powder paint to the surface of the substrate, e) heating the powder paint to sintering temperature, and f) hardening the paint.

19. The process of claim 18, comprising heating the substrate by microwave irradiation to 80 to 120° C. and hardening the paint by heating to 80 to 160° C.

20. The process of claim 19, wherein the substrate is heated by microwave irradiation to about 100° C. to 170°C. and the paint is hardened by heating to 90 to 150° C.

21. The process of claim 18, wherein the powder paint is applied to the surface of the substrate by electrostatic spraying on by the Tribo process.

22. The process of claim 18, wherein the powder paint is heated to sintering temperature by convection or by infrared irradiation, and the paint is hardened by irradiation selected from the group consisting of ultraviolet irradiation, electron irradiation and mixtures thereof.

23. The process of claim 18, wherein the powder paint applied comprises epoxy resins and polyesters that contain carboxyl groups.

24. The process of claim 18, wherein the coating applied in step a) is a water-based paint.

25. The process of claim 24, wherein the water-based paint comprises a physically drying polyurethane dispersion.

26. The process of claim 24, wherein the water-based paint comprising a physically drying polyurethane dispersion and electrically conducting pigments.

27. The process of claim 24, wherein the water-based paint comprises a physically drying acrylate dispersion in combination with a polyurethane dispersion, that is hardened by ultraviolet irradiation.

28. The process of claim 18, wherein the coating is hardened in step c) by ultraviolet radiation.

29. A process of making an object with wood based materials, comprising providing a layered material comprising a substrate of wood and a powder paint coat applied thereon, the layered material resulting from the process of a) applying to the substrate of wood a coating selected from the group consisting of extender coats and water-based paints, b) heating the substrate by microwave irradiation, c) hardening the coating, d) applying a powder paint to the substrate, e) heating the powder paint to sintering temperature, and f) hardening the paint, and incorporating the layered material into an object selected from the group consisting of coated wood panels, furniture, and parts of furniture.

* * * * *